United States Patent
Ho et al.

(10) Patent No.: US 8,347,135 B2
(45) Date of Patent: Jan. 1, 2013

(54) METHOD AND SYSTEM OF HALTING CONTENT DELIVERY BASED ON NON-DETECTION OF USER INPUT

(75) Inventors: M. James Ho, Centreville, VA (US); Samuel O. Akiwumi-Assani, Beacon, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 954 days.

(21) Appl. No.: 12/406,176

(22) Filed: Mar. 18, 2009

(65) Prior Publication Data

US 2010/0241886 A1   Sep. 23, 2010

(51) Int. Cl.
*G06F 1/00* (2006.01)
*G06F 1/26* (2006.01)
*G06F 3/048* (2006.01)

(52) U.S. Cl. .......... 713/323; 713/320; 715/764
(58) Field of Classification Search .......... 713/323, 713/320; 715/764
See application file for complete search history.

(56) References Cited

U.S. PATENT DOCUMENTS

| | | | | |
|---|---|---|---|---|
| 5,448,262 | A | * | 9/1995 | Lee et al. ............. 345/212 |
| 5,774,172 | A | * | 6/1998 | Kapell et al. ........... 725/139 |
| 6,097,378 | A | * | 8/2000 | Song .................. 345/211 |
| 6,292,943 | B1 | * | 9/2001 | Shin et al. .............. 725/58 |
| 7,027,716 | B1 | * | 4/2006 | Boyle et al. ............ 386/200 |
| 7,254,724 | B2 | * | 8/2007 | Payne ................. 713/320 |
| 7,689,939 | B1 | * | 3/2010 | Becker ................ 715/867 |
| 7,757,105 | B2 | * | 7/2010 | Okazaki .............. 713/300 |
| 7,849,463 | B2 | * | 12/2010 | Ginsberg ............. 718/102 |
| 2005/0057699 | A1 | * | 3/2005 | Bowser ............... 348/734 |
| 2007/0073709 | A1 | * | 3/2007 | Lim et al. .............. 707/10 |
| 2008/0209496 | A1 | * | 8/2008 | Jung .................. 725/131 |
| 2009/0063969 | A1 | * | 3/2009 | White ................. 715/705 |
| 2009/0070408 | A1 | * | 3/2009 | White ................. 709/203 |
| 2010/0058083 | A1 | * | 3/2010 | Rangeley ............. 713/320 |
| 2010/0083387 | A1 | * | 4/2010 | Rodgers et al. .......... 726/36 |

* cited by examiner

*Primary Examiner* — Paul R Myers
*Assistant Examiner* — Christopher A Daley

(57) ABSTRACT

An approach is provided for determining if video content provided to a device is still being viewed, without disrupting the presentation of the content. A device is monitored for input from the user, wherein the device is configured to present content to the user. A determination is made whether the user input is within a predetermined time period. A control signal is generated to change the presentation of the content without explicitly notifying the user of the change, wherein the presentation of content will cease if the user input is not within the predetermined period.

20 Claims, 6 Drawing Sheets

METHOD AND SYSTEM OF HALTING CONTENT DELIVERY BASED ON NON-DETECTION OF USER INPUT

BACKGROUND INFORMATION

Content delivery services consume substantial network resources, particularly when such services are deployed on a large scale (i.e., the number of subscribers are in the hundreds of thousands, if not millions). For example, video content is traditionally delivered via broadcasting, in which a video operator transmits video to a multitude of receiving devices, each of which renders the content on video equipment, such as televisions or other displays. New services rely on delivery of content to a unique subscriber or a group of such subscribers. When the subscriber finishes viewing the content, for example by switching to another video channel or by turning off the receiving equipment, the operator network ceases sending the content. Consequently, bandwidth is made available, and thus, can be reallocated for other purposes. However, reallocation is not possible if the subscriber leaves the receiving equipment (e.g., set-top box) on, even though the subscriber is no longer interested in the content. Under such a scenario, network resources, e.g., bandwidth, is unnecessarily utilized.

Therefore, there is a need for providing video content delivery, while minimizing waste of network resources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system of halting content delivery based on non-detection of user input are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of receiving and processing audio-video (AV) signals for presentation to a user, such as a home communication terminal (HCT), a digital home communication terminal (DHCT), a video-enabled phone, an AV-enabled personal digital assistant (PDA), and/or a personal computer (PC), as well as other like technologies and customer premises equipment (CPE). Further, although various exemplary embodiments are described with respect to video content with associated audio, it is contemplated that these embodiments have applicability to other content (e.g., images, text, multi-media, etc.) as well.

Figure 1:
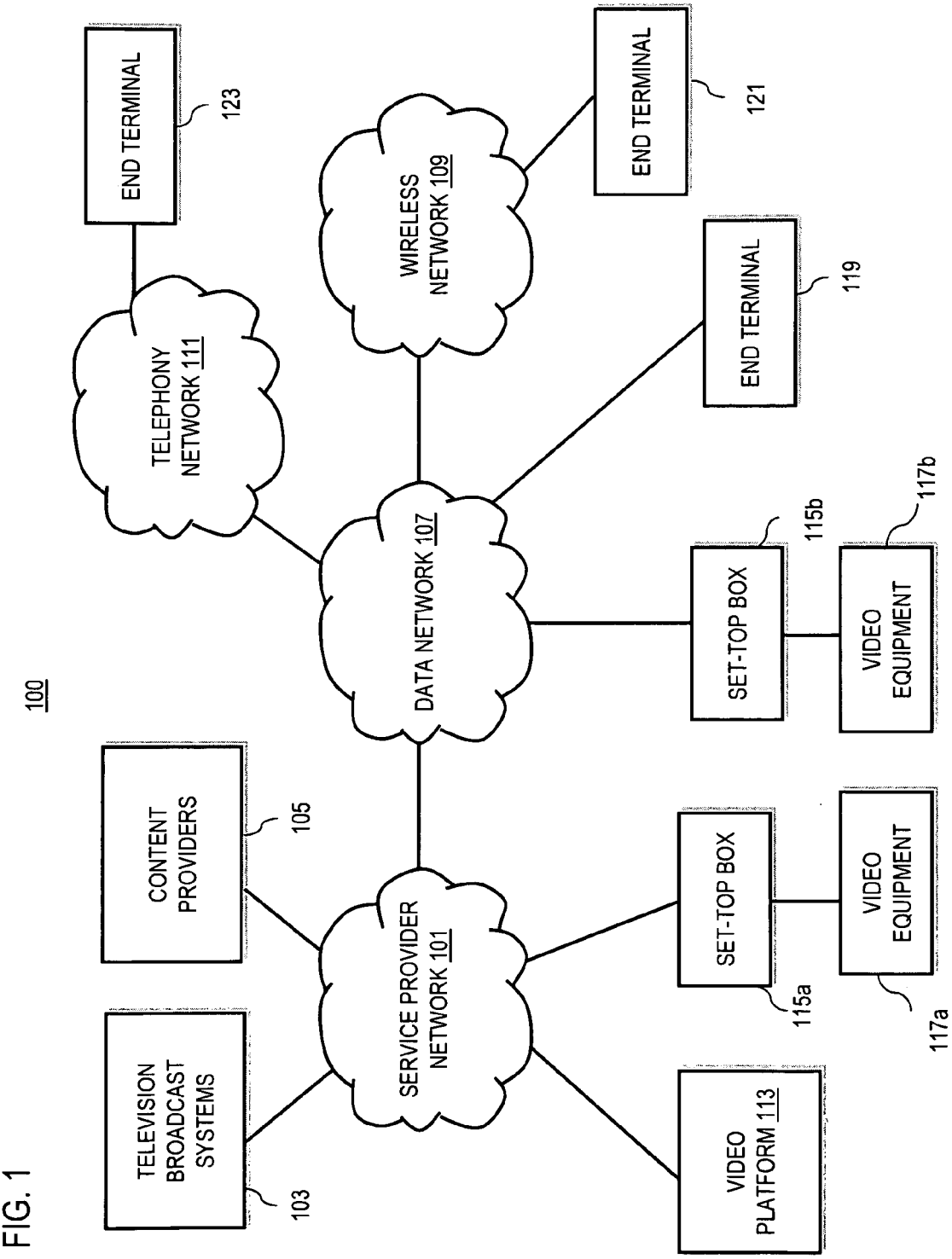
FIG. 1 is a diagram of a system for providing multimedia content to a user, according to an exemplary embodiment.

FIG. 1 is a diagram of a system for providing video content to a user, according to an exemplary embodiment. For the purposes of illustration, a system 100 for providing video content to a user is described with respect to a service provider network 101 including one or more service providers as television broadcast systems (e.g., cable television networks) 103 and content providers 105. It is contemplated that system 100 may embody many forms and include multiple and/or alternative components and facilities. Furthermore, video content is contemplated broadly to include a wide range of media. Video content can include any audio-video content (e.g., broadcast television programs, on-demand programs, pay-per-view programs, IPTV (Internet Protocol Television) feeds, data communication services content (e.g., commercials, advertisements, videos, movies, etc.), Internet-based content (e.g., streamed video) and/or any other equivalent media form.

In addition, system 100 includes a data network 107, a wireless network 109, and a telephony network 111. It is contemplated that the data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network 109 may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like.

These networks 107-111, in conjunction with service provider network 101, can support various multimedia sessions containing a variety of video programs (e.g., television broadcasts, on-demand videos, etc.). Video platform 113 provides the capability to determine whether users have stopped watching the content, to shut down the receiver, to cease transmission of the content, and to reallocate the bandwidth. This approach stems from the recognition that network resources are wasted when users (or subscribers) are no longer interested in viewing the delivered content, but do not bother to deactivate the receiving equipment. As such, the operator's network will assume that the subscriber is still viewing the content and will continue broadcasting. Some traditional approaches to addressing this issue include transmitting a notification to the user for alerting the user that broadcast of the content will halt (or cease). However, these notifications disrupt the user experience. For example, the subscriber can be viewing a critical moment in a sporting event, and is interrupted with this message, causing the viewer to miss this important moment. Such experience can infuriate the subscriber, who may then complain to the service provider or worse seek to terminate the service.

Unlike traditional systems, video platform 113 monitors video receiving equipment (e.g., set-top boxes 115, end terminals 119, 121 and 123) for user input, sends a non-disruptive notification to the user that the video broadcast will cease. The video platform 113 can then halt the video broadcast to the user and transmits control signals to shutdown these receiving devices, if no user input is detected (i.e., non-detection of user input) within a predetermined, configurable time period. Non-disruptive notification, for example, can encompass any form of notification that does not hide a significant portion of the displayed video content, interrupt the displayed video content, and/or interrupt audio content.

It is recognized that users at times, for example, periodically manipulate the volume control based on the particular scenes of the video broadcast. That is, during a scene in which the viewer wants to hear a dialogue better (i.e., louder) or the scene has the viewer's favorite music, such viewer would be inclined to increase the volume. Moreover, at times, the scene can involve acutely loud audio, such as a explosion or undesirable music. Consequently, the viewer would likely reduce the volume. Therefore, in one embodiment, a mechanism is devised to subtly reduce or increase the volume so as to force a reaction by the viewer without the viewer being aware of the reduction. In this manner, the viewer is not even aware that there has been an attempt by the network to halt the video delivery.

As seen in FIG. 1, the video platform 113 has connectivity to set-top boxes 115a and 115b via service provider network 101 and data network 107, respectively. Video equipment 117a and 117b may provide to the user a display of the video content supplied to STBs 115a and 115b, respectively. Video equipment 117a and 117b for instance may be a television or a computer monitor, or any equivalent display device capable of being turned off separately from the receiving equipment. The platform 113 also has connectivity to end terminal 119 via data network 107, end terminal 121 via wireless network 109, and end terminal 123 via telephony network 111.

For example, end terminal 119 may be any computing device (e.g., Personal Digital Assistant (PDA), personal computer, laptop, etc.) or communication device (e.g., a video conferencing terminal), or a digital home communication terminal (DHCT). End terminal 121 may be any video-enabled mobile device (e.g., a mobile handset, video-capable cellular telephone, etc.). Furthermore, end terminal 123 may, for instance, include a home communication terminal (HCT) or any other telephonic device.

STBs 115a-115b and/or end terminals 119-123 can communicate using data network 107, wireless network 109, and/or telephony network 111. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, Hybrid Fiber Coax network, provider specific networks (e.g., a Verizon® FiOS network, a TIVO™ network, an AT&T UVerse network, etc), and the like. Such networks may also utilize any suitable protocol supportive of data communications, e.g., DSMCC, or other proprietary protocol, transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 115a-115b and/or end terminals 119-123 to the video platform 113 and to various sources of video content.

Although depicted in FIG. 1 as separate networks, data network 107, wireless network 109, and/or telephony network 111 may be completely or partially contained within service provider network 101. For example, service provider network 101 may include facilities to provide for transport of packet-based, wireless, and/or telephony communications. In particular embodiments, service provider network 101 can include a switched video network such as a switched Quadrature Amplitude Modulation (QAM) or an IPTV system (not shown) configured to support the transmission of television video programs from television broadcast systems 103 as well as other video content, such as media content from the various third-party content providers 105 utilizing MPEG (Motion Picture Experts Group) or other video transport streams. An IPTV system may additionally encapsulate the MPEG or other transport streams in IP packets. That is, the IPTV system may deliver signals and/or video content in the form of IP packets. Further, the transmission network (e.g., service provider network 101) may optionally support end-to-end data encryption in conjunction with the delivery of video content.

In this manner, the use of IP permits video content to be integrated with broadband Internet services, and thus, share common connections to a user site. Also, IP packets can be more readily manipulated, and therefore, provide users with greater flexibility in terms of control, as well as offer superior methods for increasing the availability of video content. Delivery of video content, by way of example, may be through a multicast from the IPTV or switched digital system to the STBs 115a-115b and end terminals 119-123. Any individual STB or end terminal may tune to a particular video source by requesting such video source from the service provider 101, or simply joining a multicast (or unicast) of the video content utilizing an IP group membership protocol (IGMP). For instance, the IGMP v2 protocol may be employed for joining STBs to new multicast (or unicast) groups. Such a manner of delivery avoids the need for expensive tuners to view video content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the video content may be provided to various IP-enabled devices, such as the computing, telephony, and mobile apparatuses previously delineated.

While system 100 is illustrated in FIG. 1, the exemplary components are not intended to be limiting, and indeed, additional or alternative components and/or implementations may be utilized.

Figure 2:
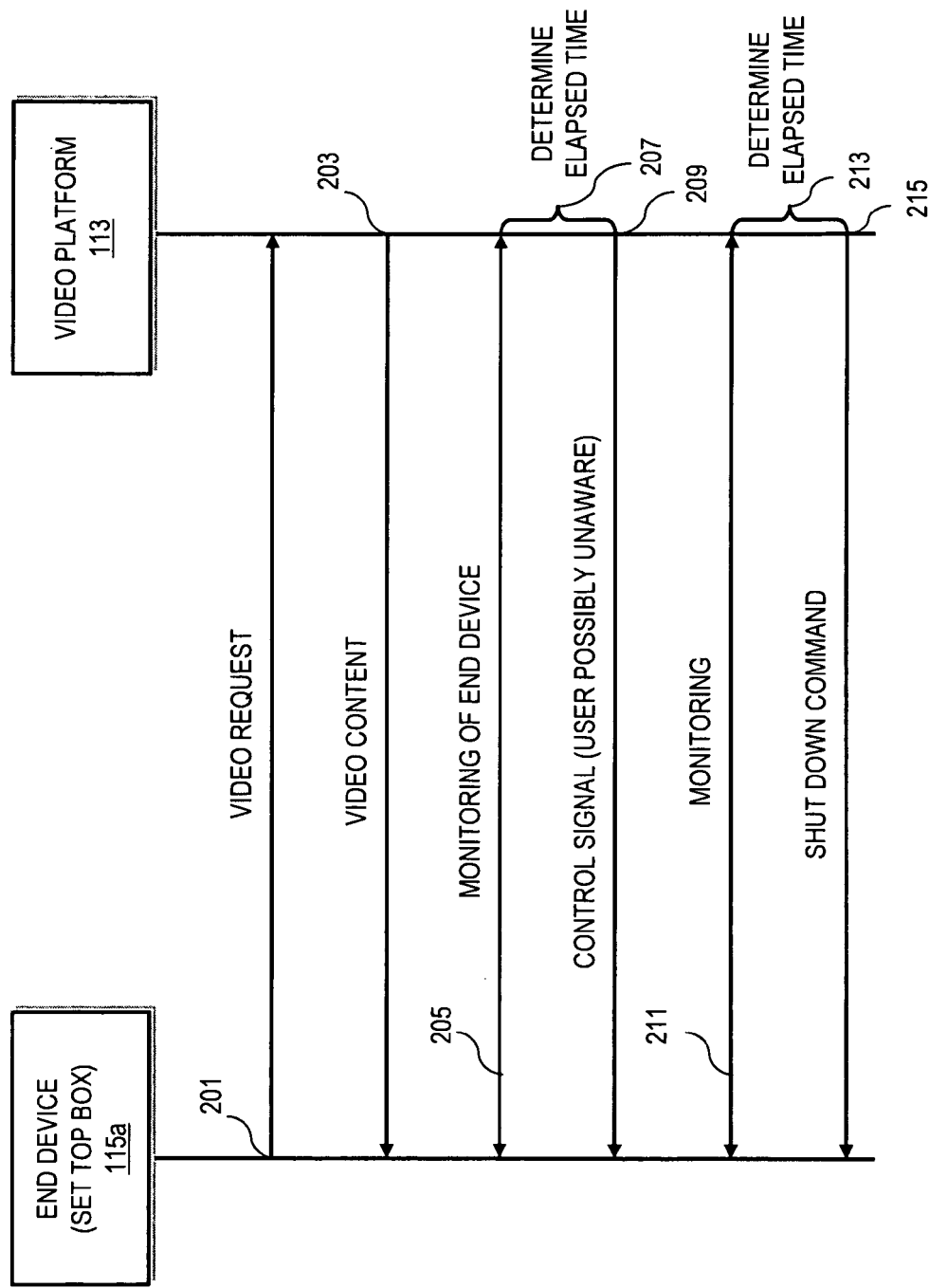
FIG. 2 is a diagram of an exemplary process for shutting down a video broadcast.

FIG. 2 is a diagram of an exemplary process for ending a video broadcast and shutting down an STB. STB 115a requests video content from a service provider at step 201. Video platform 113 transmits the requested video to the STB 115a at step 203. Video equipment, such as a television or monitor, may be connected to STB 115a for displaying the video content to a user (viewer). In step 205, video platform 113 monitors STB 115a for input from the user. Such input may include changing to another video channel or turning off the STB. While monitoring STB 115a, video platform 113 determines an elapsed time (step 207). If the elapsed time reaches a predetermined value with no input from the user, video platform 113 transmits a control signal to the STB 115a at step 209. The signal may be an instruction to raise or lower the volume of the video content displayed on the user's video equipment. In certain embodiments, the level of reduction or increase is subtle (e.g., users are not conscious or is unaware) as to provoke the viewer to react to the change without the viewer realizing the controls are being manipulated; that is, there is no explicit notification to the user about the change. The signal may instruct the STB 115a to gradually or incrementally change the volume to a muted level, or to another preset level, over a predetermined time period. Typically, if the user does not react, it is assumed the viewer is no longer interested in the video content (e.g., user is asleep, left the room, etc.). Because the change may be too subtle for some viewers, an incremental change can be effected, whereby the volume is manipulated in a stepped fashion.

Alternatively, the signal may also include an instruction to display a visual indication of a change in volume. At step 211, video platform 113 again monitors for user input in response to the control signal. While monitoring STB 115a, video platform 113 once again determines the elapsed time (step 213). If the second period of elapsed time reaches a predetermined value, at step 215 video platform 113 ceases transmission of the video content and transmits a command to the STB 115a to shut down. Multiple iterations of steps 209, 211 and 213, may be conducted according to retry logic algorithms of the shutdown module 301 in video platform 113 prior to proceeding to ceasing the transmission of video content in step 215. Further details of the video platform 113 are described with respect to FIG. 3.

Figure 3:
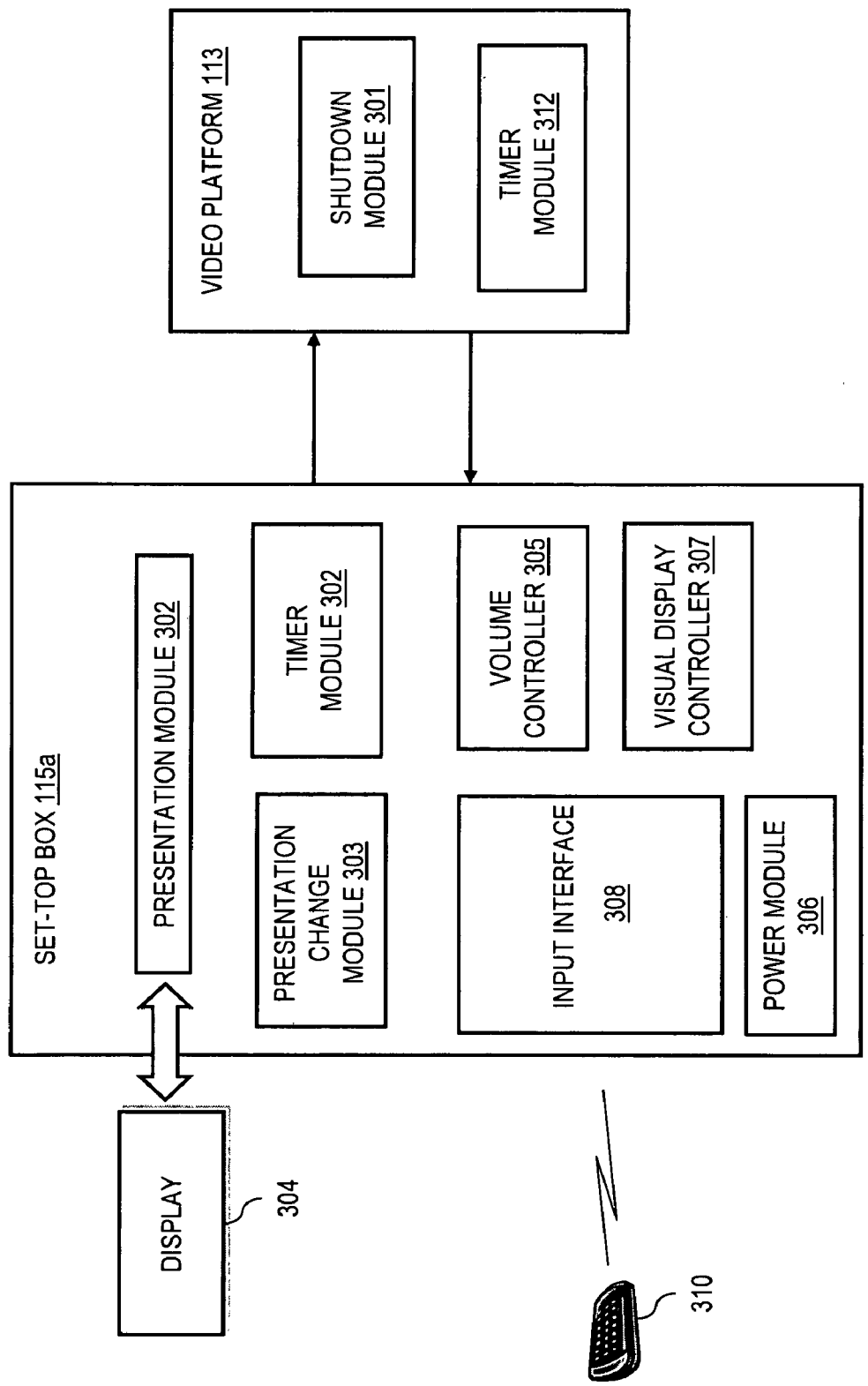
FIG. 3 is a diagram illustrating the interaction between a set-top box and the video platform, according to an exemplary embodiment.

FIG. 3 is a diagram illustrating the interaction between STB 115a and a video platform 113, according to an exemplary embodiment. Video platform 113 transmits video content to STB 115a. Video platform 113 includes a device shut down module 301, which monitors STB 115a for user input and may include a timer (or counter) module 302 for determining the amount of time that has elapsed since prior action by the user. Alternatively, the device shut down module 301 may receive an indication from the STB 115a that a certain time period has expired since a prior detection of user input. In one embodiment, a control signal and a subsequent shutdown signal are generated by shutdown module 301 and transmitted to STB 115a. The shutdown signal, in one embodiment, informs the STB 115a about the termination of the video source, thereby permitting the STB 115a to perform any necessary functions, including powering itself off. A presentation module 302 provides the video content to the display 304 for presentation to the user.

In certain embodiments, STB 115a includes a presentation change module 303 for generating signals to change or modify the presentation of the content (e.g., reduce volume) and/or to alert the user about potential shutdown of the STB 115a. The presentation change module 303 can effect the shutdown by controlling a power module 306 of the STB 115a. STB 115a also includes an input interface 308 for receiving input from a user via a remote controller 310 or other input devices (e.g., keypad on the STB 115a); the input interface 308 operates in conjunction with the presentation change module 303 to monitor for user input. Input interface 308 may support any type of wired and/or wireless link, e.g., infrared, radio frequency (RF), BLUETOOTH, and the like.

Presentation change module 303 includes a mechanism for detecting user input received via the input interface 308 as well as a mechanism for determining the time interval since a prior user input; such timing mechanism can include a timer or a counter, for example. Moreover, presentation change module 303 can include a signal generator for generating and sending a signal to video platform 113 requesting instructions when no user input has been detected within a certain period of time. Alternatively or additionally, presentation change module 303 may include a sleep timer function for automatically shutting down after a programmed period of time has elapsed. Module 303 receives control signal and shutdown signal from video platform 113.

By way of example, the module 303 can interact with volume controller 305 and/or visual display controller 307 to produce the notification to the user. Although the visual display controller 307 is shown as a separate module, it is noted that such controller 307 can be a part of the presentation module 302, according to an alternative embodiment. The presentation change module 303 can signal to volume controller 305 to either increase or decrease the volume of the program; in addition to or alternatively, the visual display controller 307 can be instructed to present a visual indicator, such as a series of bars, relating to the volume control. It is contemplated that any visual indicator can be utilized, and can be independent of the volume. This volume adjustment and/or visual representation of a volume change serves as a precursor for the eventual power down (i.e., off) of the STB 115a or simply termination of the video source to the STB 115a. Presentation change module 303 may initiate the shutdown in response to a signal from video platform 113 and/or at the expiration of the timer within the presentation change module 303. In one embodiment, the video platform 113 itself can employ a timing mechanism via timer module 312; consequently, the set-top box 115a need not possess a timer.

Figure 4:
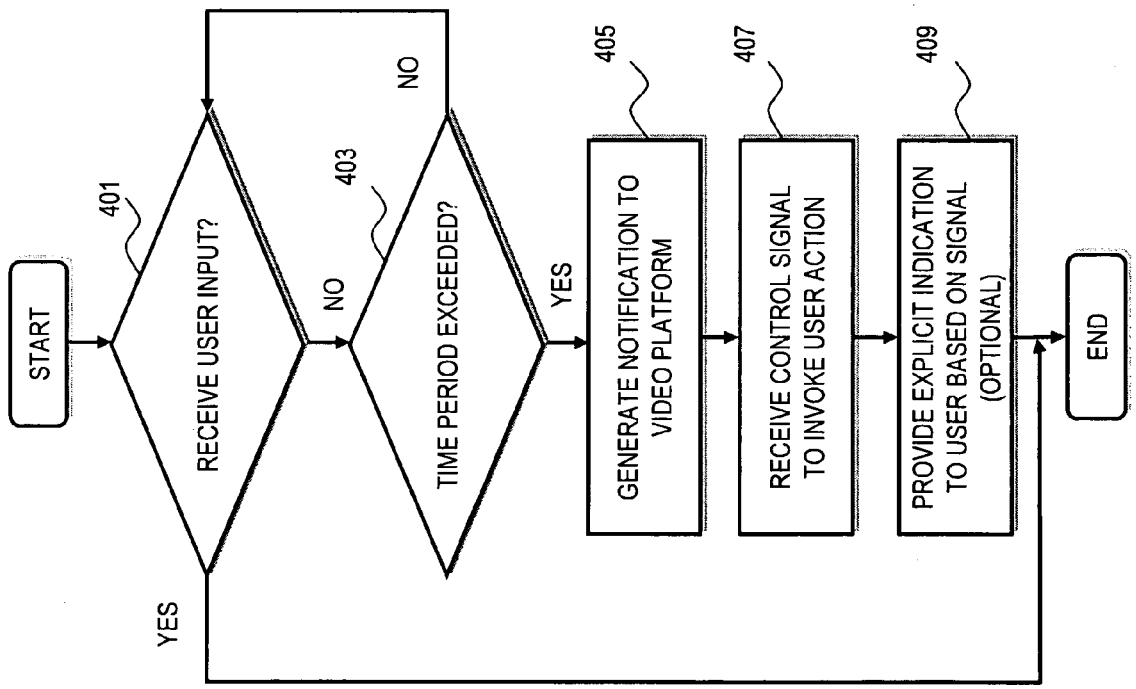
FIG. 4 is a flowchart of a process for shutting down a video broadcast or shutting down the video source to the receiver, according to an exemplary embodiment.

FIG. 4 is a flowchart of a process for ceasing a video broadcast and shutting down the receiver or shutting down the video source to the receiver, according to an exemplary embodiment. The process begins with STB 115a activating a timer upon detection some activity. In step 401, STB 115a determines whether an input has been received from the user since the initial input; such subsequent input (e.g., signals emitting from depressing or activating a button on a remote control device or on a keypad on the STB 115a) is indicative of the fact that the user is still viewing presented content. If no user input has been received, STB 115a determines whether a predetermined time period has been exceeded at step 403. If the predetermined time period has not elapsed, the process continues to monitor for user input. If, on the other hand, the predetermined period of time has passed with no input from the user, STB 115a generates a notification to video platform 113 that no action has been detected by the user (step 405).

In step 407, the STB 115a receives a control signal from video platform 113 in response to the notification. It is contemplated that the control signal may be, for example, an instruction to change the volume of the audio portion of content presented to the user, e.g., to a substantially muted level or to an undesirably high level, to invoke an action (e.g., turning up or down the volume) by the user. The user need not be aware of this control signal. It is contemplated that the volume change may occur either gradually to a predetermined level over a set period of time or may occur incrementally. For example, the volume level can be modified in two phases, in which the first phase involves a minor change in volume and the second phase is a major change in the same direction after a particular time interval. It is noted that the both phases can be subtle or not readily perceived by the viewer. However, subsequent phases (if implemented), the change in the content (e.g., volume) can be noticeable.

Namely, in one embodiment, STB 115*a* provides an explicit indication to the user based on the received signal at step 409. The indication to the user may be a noticeable or dramatic change in the volume of the presented content. As noted previously, in addition, the indication to the user may include a visual representation of a change in volume, such as a bar graph illustrating the current volume.

Once the STB 115*a* provides the indication subtly or noticeably (i.e., explicitly) to the user, monitoring may occur for detection of a response from the user, such as pressing the volume control button on a remote control for the video equipment. If no such response is detected within a predetermined time period, the STB 115*a* may generate a second notification to the video platform 113. It is contemplated that the STB 115*a* may await shutdown, further instructions from video platform 113, or may automatically request termination of the video source from video platform 113 to the STB 115*a*. The STB 115*a* may perform additional functions, such as shutdown, in accordance with a sleep timer, for instance. In response to the notification, video platform 113 may signal STB 115*a* to shutdown or perform a different function and may cease transmission of video content to STB 115*a*, making bandwidth available for reallocation.

Figure 5:
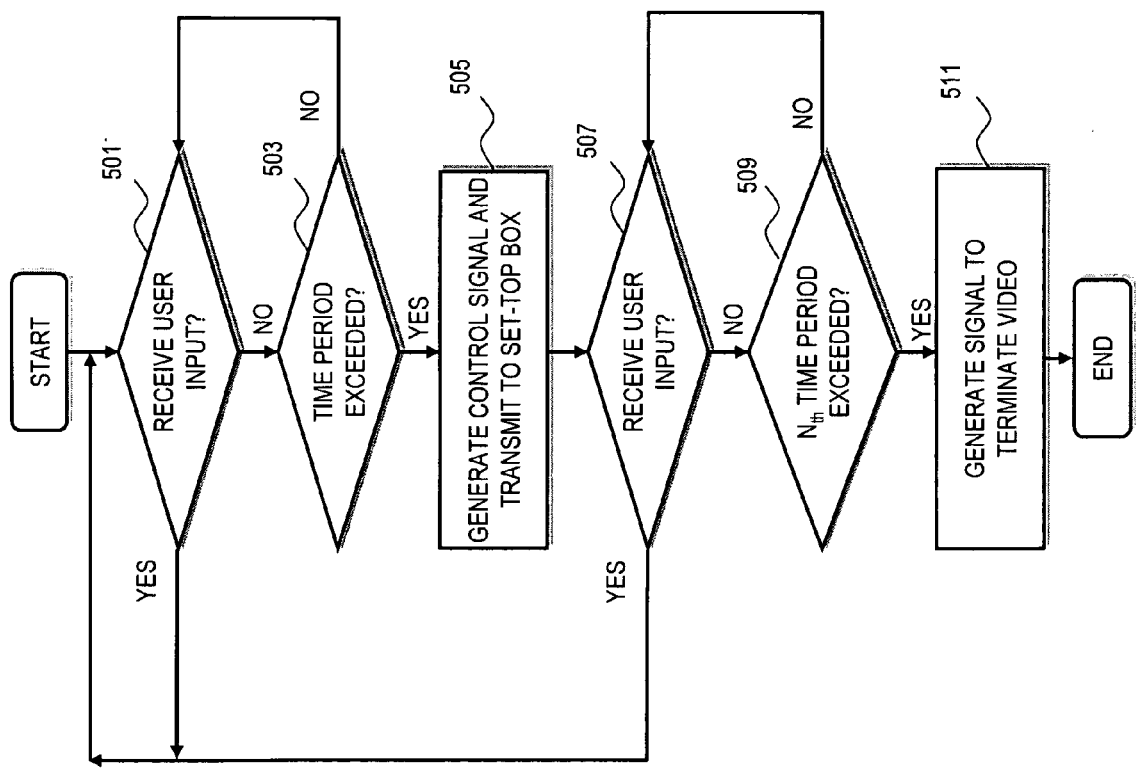
FIG. 5 is a flowchart of a process for shutting down a video broadcast from the user's perspective, according to an exemplary embodiment.

FIG. 5 is a flowchart of a process for ceasing a video broadcast and shutting down the receiver or requesting the receiver to perform another function from the standpoint of video platform 113, according to an exemplary embodiment. The process begins with monitoring for user input. If no input is received from a user at step 501, video platform 113 determines at step 503 whether a predetermined time period has been exceeded. If not, the process returns to step 501 to continue monitoring for user input. If the time period has expired at step 503, video platform 113, at step 505, generates a control signal and transmits the signal to STB 115*a*. It is contemplated that the signal may be an instruction for the STB to alter the volume of content presented to the user either gradually over a predefined time interval or as a series of two or more incremental changes. Further, the signal may include an instruction to visually indicate to the user that the volume of the content is being changed.

Once the control signal is transmitted to STB 115*a*, video platform 113 monitors for a response from the user at step 507. If the user responds, i.e., user input is detected, the process returns to start and monitoring for user input begins again with a new timer. Action by the user indicates that the subscriber is still viewing the video content. If no action is taken by the user, i.e., no user input is detected, video platform 113 determines if multiple time periods has been exceeded, as in step 509. If the Nth time period (N being an integer) is still running, video platform 113 returns to step 507 and continues monitoring for a response from the user. The value N can be set depending on the particular application and user requirements, for example. If the time period has elapsed, video platform 113 generates a termination of video signal at step 511, ceases transmitting the video content, and reallocates the bandwidth.

Although FIG. 5 shows steps 507 through 511 being performed by the video platform, it is contemplated that the second monitoring and timing steps may instead be performed by STB 115*a*. For example, video platform 113 may transmit with the control signal in step 505 an enable signal to enable a sleep timer. STB 115*a* may then monitor for user input. If user input is detected before the expiration of the sleep timer, STB 115*a* either may be programmed to disable the sleep timer automatically and to notify video platform 113 to cease transmission of the video content or may notify video platform 113 and await instructions to disable the sleep timer. In either event, in response to the notification from STB 115*a*, video platform 113 ceases transmissions to STB 115*a* and reallocate the bandwidth.

The processes described herein for halting content delivery based on detection of user input may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
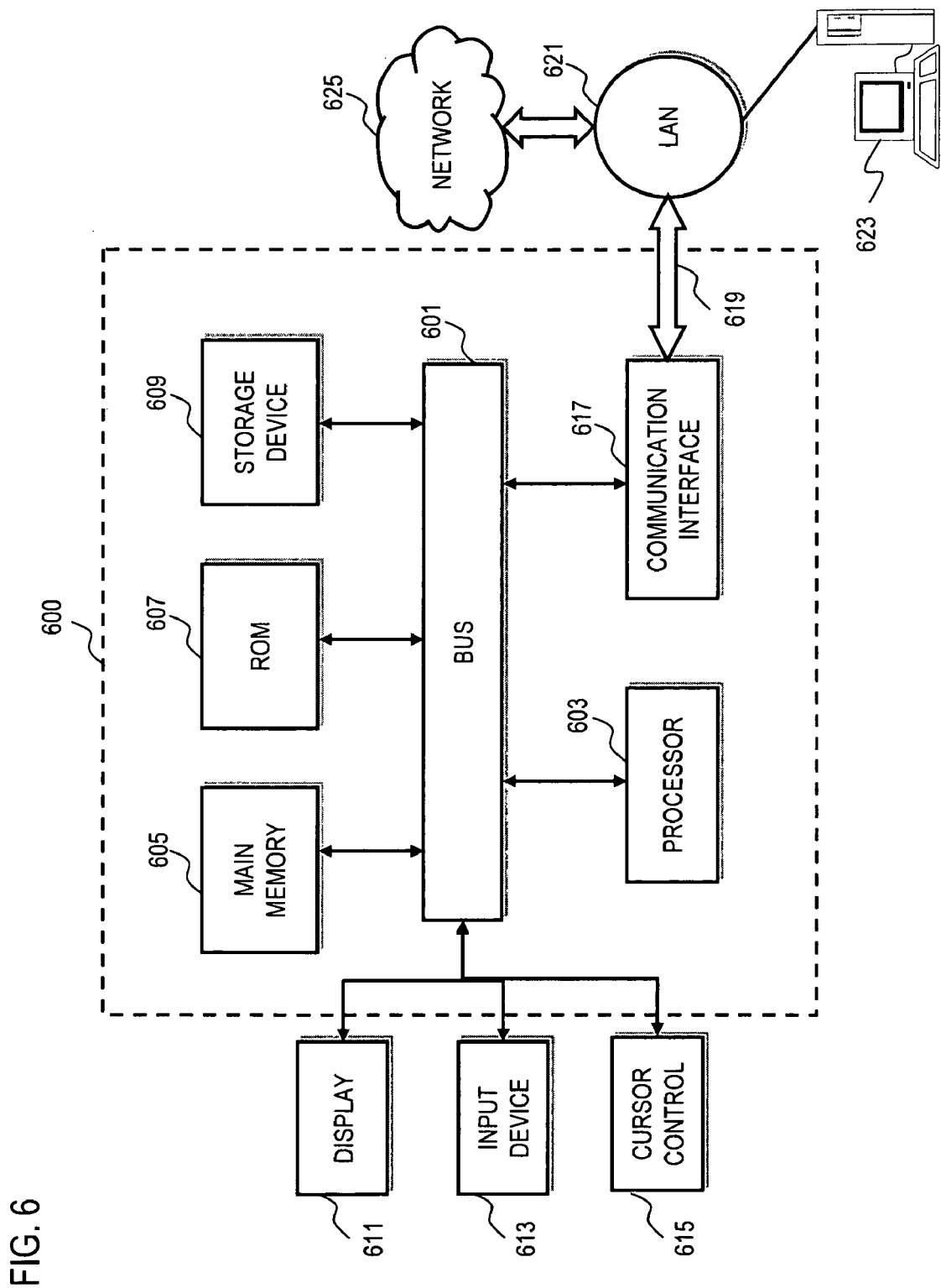
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, a Quadrature Phase Shift Keying (QPSK) or Quadrature Amplitude Modulation (QAM) signaling interface, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    monitoring a device, configured to present content to a user, for input from the user;
    determining whether the user input is within a first predetermined time period; and
    when there is no user input within the first predetermined time period, generating a control signal to change the presentation of the content without explicitly notifying the user of the change, wherein the presentation of content will cease if the user input is not within a second predetermined time period initiated concurrently with generating the control signal,
    wherein changing the presentation of the content does not interrupt displaying the content.

2. A method according to claim 1, further comprising:
    transmitting the control signal to the device.

3. A method according to claim 2, wherein the second predetermined time period includes one or more subsequent predetermined time periods, the method further comprising:
    generating a shutdown signal or a second control signal, if no user input is detected within the one or more subsequent predetermined time periods, wherein the shutdown signal informs the device that a video source to the device is being terminated.

4. A method according to claim 1, wherein the content comprises an audio portion, and the control signal comprises a volume change command, a visual indication command, or a combination thereof.

5. A method according to claim 1, further comprising:
    generating an enable signal, with the control signal, to enable a sleep timer for deactivation of the device.

6. A method according to claim 1, wherein the device comprises a set-top box, a computer, or equipment capable of receiving a video signal.

7. An apparatus comprising:
    a processor configured to monitor a device, configured to present content to a user, for input from the user,
    wherein the processor is further configured to determine whether the user input is within a first predetermined time period, and when there is no user input within the first predetermined time period, to generate a control signal to change the presentation of the content without explicitly notifying the user of the change, wherein the presentation of content will cease if the user input is not within a second predetermined time period initiated concurrently with generate the control signal, and wherein change the presentation of the content does not interrupt displaying the content.

8. An apparatus according to claim 7, further comprising:
a communication interface configured to transmit the control signal to the device.

9. An apparatus according to claim 7, wherein the second predetermined time period includes one or more subsequent predetermined time periods, the processor is further configured to determine whether the user input is within the one or more subsequent predetermined time periods, and to generate a shutdown signal or a second control signal, if no user input is detected within the one or more subsequent predetermined time periods, wherein the shutdown signal informs the device that a video source to the device is being terminated.

10. An apparatus according to claim 7, wherein the content comprises an audio portion, and the control signal comprises a volume change command, a visual indication command, or a combination thereof.

11. An apparatus according to claim 7, wherein the processor is further configured to generate an enable signal, with the control signal, to enable a sleep timer for deactivation of the device.

12. A method comprising:
presenting content to a user;
receiving a control signal; and
changing the presentation of the content without explicitly notifying the user of the change, wherein the presentation of content will cease if a user input is not within a predetermined period,
wherein changing the presentation of the content does not interrupt displaying the content.

13. A method according to claim 12, further comprising:
receiving a shutdown signal after provision of an indication to the user.

14. A method according to claim 12, further comprising:
detecting the user input within the predetermined period of time; and
transmitting a notification signal to a video platform specifying the detected user input.

15. A method according to claim 12, further comprising:
receiving an enable signal for enabling a sleep timer to halt the presentation of the content after expiration of the sleep timer,
shutting down if no user input is received.

16. A method according to claim 15, further comprising:
receiving a disable signal for disabling the sleep timer if the user input is received prior to expiration of the sleep timer; and
disabling the sleep timer if the user input is received.

17. A method according to claim 13, wherein the indication to the user comprises changing a volume of the presentation, a visual indication command, or a combination thereof.

18. A method according to claim 17, wherein the volume change is a gradual decrease to a substantially muted level for a predetermined time interval, or is increased or decreased in two or more increments.

19. An apparatus comprising:
a presentation module configured to present content to a user; and
a presentation change module configured to receive a control signal,
wherein the presentation module is further configured to change the presentation of the content without explicitly notifying the user of the change, wherein the presentation of content will cease if a user input is not within a predetermined period, and
wherein change the presentation of the content does not interrupt displaying the content.

20. An apparatus according to claim 19, further comprising:
a power module configured to power the apparatus, wherein the presentation change module is further configured to receive a shutdown signal for powering down the power module.

* * * * *